(No Model.)
S. J. CROCKETT.
Combined Match Box and Cigar Cutter.
No. 240,665. Patented April 26, 1881.
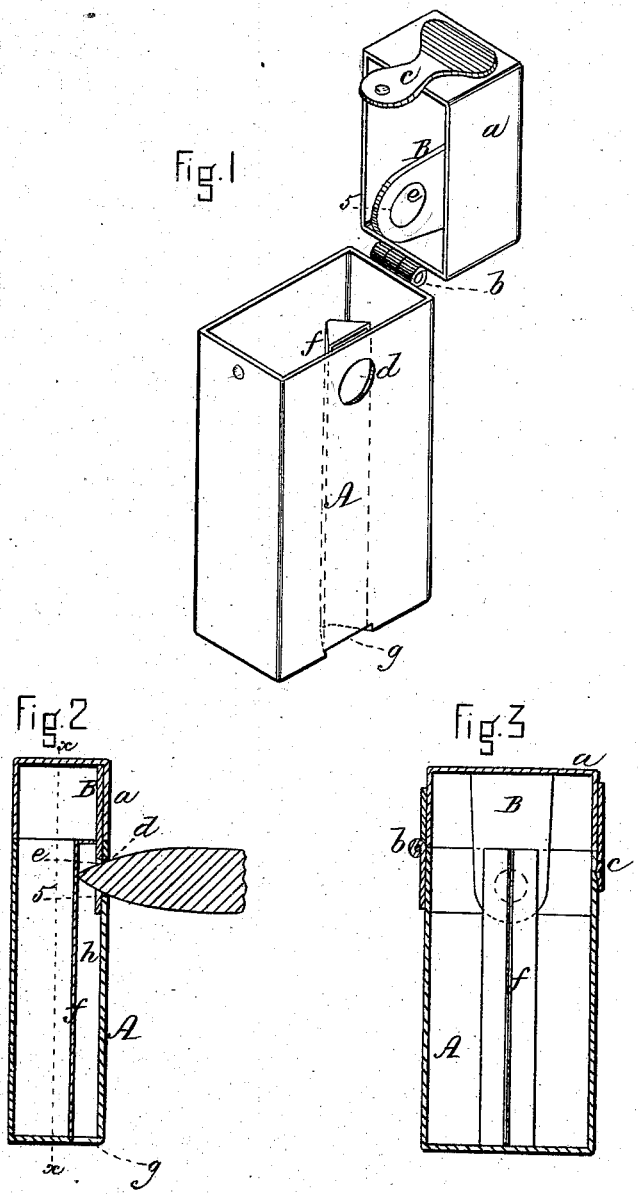

United States Patent Office.

SAMUEL J. CROCKETT, OF BOSTON, MASSACHUSETTS, ASSIGNOR TO HIMSELF AND THOMAS F. SCANLAN, OF SAME PLACE.

COMBINED MATCH-BOX AND CIGAR-CUTTER.

SPECIFICATION forming part of Letters Patent No. 240,665, dated April 26, 1881.

Application filed November 13, 1880. (No model.)

*To all whom it may concern:*

Be it known that I, SAMUEL J. CROCKETT, a citizen of the United States, residing at Boston, in the county of Suffolk and State of Massachusetts, have invented a Combined Match-Box and Cigar-Cutter, of which the following is a full, clear, and exact description, reference being had to the accompanying drawings, making part of this specification, in which—

Figure 1 is a perspective view of my combined match-box and cigar-cutter, the cover of the box being raised. Fig. 2 is a vertical section through the same with the cover shut down, illustrating the method of cutting off the tip or pointed end of a cigar. Fig. 3 is a vertical section on the line $x\ x$ of Fig. 2.

My invention consists in a match-box having a simple device combined therewith for cutting off the tip or pointed end of a cigar, which is effected by inserting it into a small aperture or gage-hole in the side of the box and severing it by means of a knife or cutter attached to the cover or main portion of the box, and adapted to be brought into contact with the tip when inserted within the gage-hole, the necessity of biting off the tip or employing a penknife for the purpose, as heretofore, being thus obviated; and my invention also consists in the combination, with the box and its cutter, of a channel or passage-way for receiving the waste tips of the cigars and conducting them out of or away from the box, as hereinafter specified.

To enable others skilled in the art to understand and use my invention, I will proceed to describe the manner in which I have carried it out.

In the said drawings, A represents the main portion of a pocket match-box, composed of metal or other suitable material, and $a$ the cap or cover, which is hinged thereto at $b$, and held in place, when closed, by means of a spring-catch, $c$, in the usual manner.

In one side of the box A is formed a small circular aperture or gage-hole, $d$, of a size adapted to receive the tip or pointed end of the cigar; and to one side of the interior of the cover $a$ of the box is secured a thin steel plate, B, which, when the cover is closed, projects down a short distance within the main portion A of the box. Through this plate B is formed a circular aperture, $e$, of about the same diameter as the hole $d$, or a little larger, the apertures $d$ and $e$ being in line with each other when the cover of the box is closed, so that the tip of the cigar, when inserted within the hole $d$, as seen in Fig. 2, will pass through the hole $e$ in the plate B.

The metal around the lower half of the aperture $e$ is beveled on the inner side of the plate B, so as to form a cutting-edge, 5, and thus, when the tip or pointed end of the cigar is inserted into the gage-hole or aperture $d$ in the side of the box, as seen in Fig. 2, the act of raising the cover $a$ to open the box will cause the cutting-edge 5 to pass through and cut off the tip, as desired. The cigar can then be placed in the mouth and a match taken out of the box, which may then be closed and replaced in the pocket, a convenient means, always at hand with the match-box, being thus afforded for cutting off the ends of cigars.

To the inside of the main portion A of the box is secured a bent or curved plate, $f$, which extends longitudinally from the gage-hole $d$ to an opening, $g$, in the bottom of the box, forming a channel or passage-way, $h$, for the reception of the waste tip or end of the cigar after it has been cut off, which then drops through this passage and escapes through the opening $g$ to the ground; and by the employment of this device the waste ends or tips are prevented from falling into and accumulating within the receptacle which contains the matches.

What I claim as my invention, and desire to secure by Letters Patent, is—

1. The box A, provided with the aperture $d$, in combination with the top $a$ and plate B, having an aperture, $e$, provided with a sharp edge, and arranged to coincide with aperture $d$ when the box is closed, substantially as and for the purpose set forth.

2. The combination, with the box A, having an aperture or gage-hole, $d$, for the tips of the cigars, and a cutter, B, for severing the same, of an open end channel or passage-way, $h$, for receiving the waste tips of the cigars and conducting them out of or away from the box, substantially as set forth.

Witness my hand this 3d day of November, A. D. 1880.

SAML. J. CROCKETT.

In presence of—
P. E. TESCHEMACHER,
W. J. CAMBRIDGE.